April 30, 1935.  J. M. PATTERSON  1,999,206
WHEEL MOUNTING TOOL
Filed April 14, 1934    2 Sheets-Sheet 1
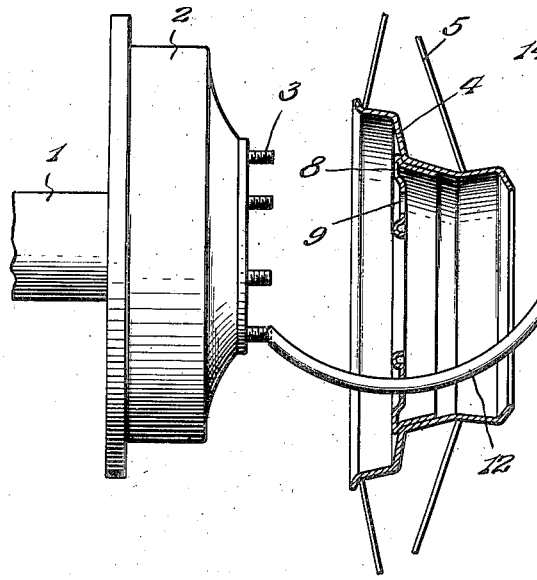
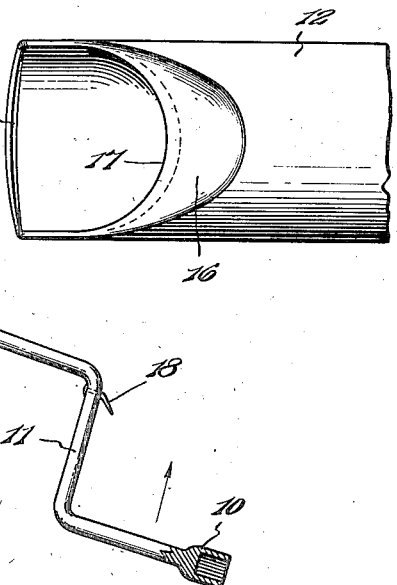
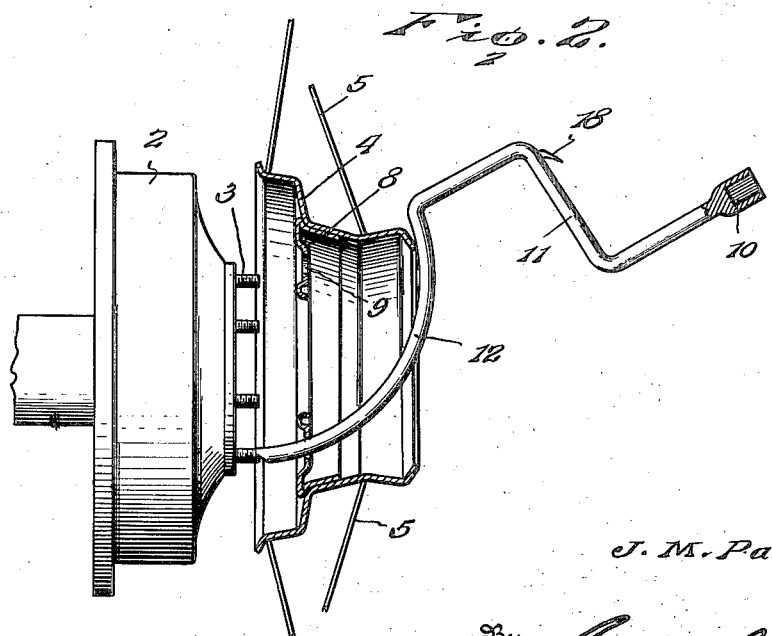
Inventor
J. M. Patterson.
By Lacey & Lacey, Attorneys April 30, 1935.  J. M. PATTERSON  1,999,206
WHEEL MOUNTING TOOL
Filed April 14, 1934    2 Sheets-Sheet 2
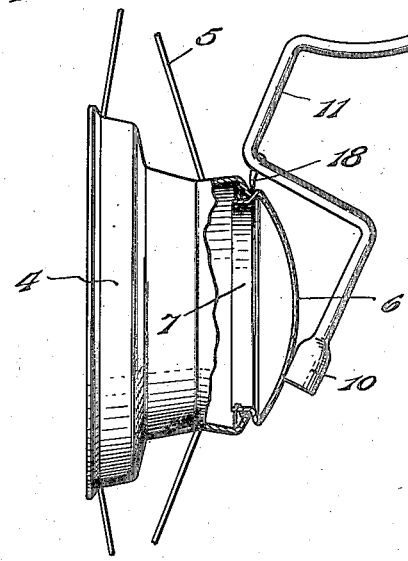
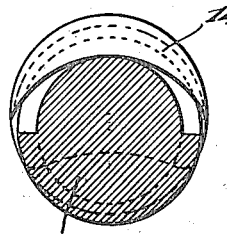
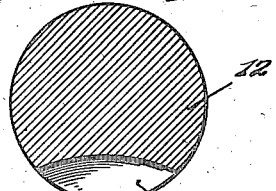
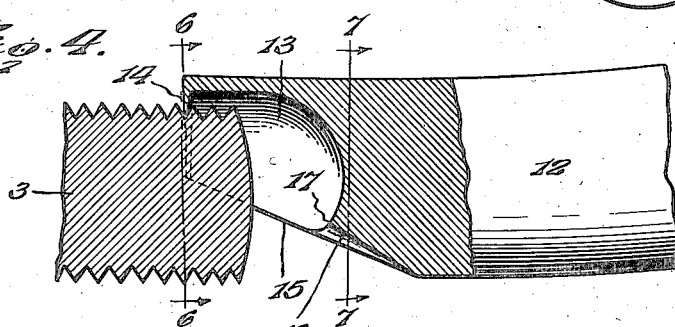
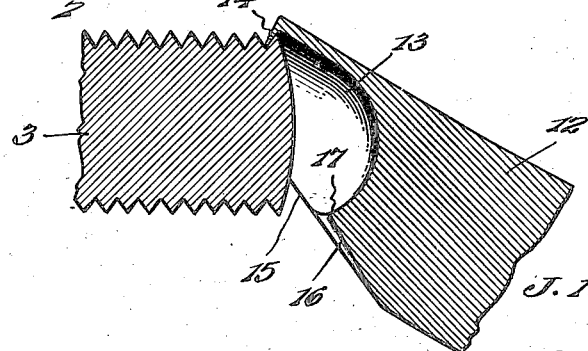
Inventor
J. M. Patterson.
By Lacey & Lacey, Attorneys Patented Apr. 30, 1935

1,999,206

UNITED STATES PATENT OFFICE 1,999,206

WHEEL-MOUNTING TOOL

James M. Patterson, Dallas, Tex.

Application April 14, 1934, Serial No. 720,633

5 Claims. (Cl. 29—84)

This invention relates to means for mounting a vehicle wheel upon the hub or brake drum of an automobile and has for its object the provision of a simple and inexpensive tool, by the use of which the mounting of a wheel may be very easily, rapidly and conveniently effected. The invention is illustrated in the accompanyng drawings and consists in certain novel features which will be particularly pointed out in the appended claims.

It is frequently necessary to remove an automobile wheel from its mounting in order that temporary repairs to the tire may be made, or a spare wheel substituted for the wheel which has been put out of commission. This work is laborious and is very apt to greatly soil the hands and clothes of the operator, as now ordinarily performed, but my invention provides a simple tool whereby the wheel may be very rapidly mounted without involving hard work or soiling the clothes or hands of the operator at all.

In the drawings:

Figure 1 is a view, partly in elevation and partly in vertical section, showing my improved tool engaged with a wheel hub and with a lug or stud on the brake hub in position to effect re-mounting of the wheel.

Figure 2 is a similar view showing the wheel as just about in position to slip onto the lugs or studs of the hub.

Figure 3 is a similar view showing the use of a decapper which forms an element of the tool.

Figures 4 and 5 are enlarged longitudinal sections of one end of the tool and of a lug or stud engaged therewith.

Figure 6 is a detail transverse section on the line 6—6 of Figure 4.

Figure 7 is a detail transverse section on the line 7—7 of Figure 4.

Figure 8 is a bottom plan view of the end of the tool.

In the drawings, the reference numeral 1 indicates an axle and 2 indicates the hub or brake drum which is secured upon the axle, the hub 2 being provided on its outer side with an annular series of threaded studs or lugs 3 which are equidistantly spaced on the hub. The automobile wheel, as now generally constructed, comprises a drum 4 in which spokes 5 are secured, the spokes extending from the drum to the rim or felloe of the wheel, as will be understood. The drum 4 is open at its ends and the outer end is normally closed by a hub cap 6 which is yieldably engaged upon or in the outer open end of the drum so that it will effectually prevent the entrance of sand, dirt or other foreign matter which would produce unnecessary wear, but may be readily removed when necessary. In the particular arrangement illustrated, the hub cap is provided with a rim 7 which may be resilient or may be equipped with small spring fingers adapted to engage the inner surface of the drum around the opening therein so that the cap will be effectually retained in position. The drum is also provided with an annular flange 8 between its ends and this flange is formed with a plurality of openings 9 corresponding in arrangement with the lugs or studs 3 and of such diameter that they may readily engage over the respective studs. Nuts (not shown) are engaged upon the outer ends of the several studs or lugs 3 and turned home against the flange 8 to secure the wheel in position.

To remove the nuts by which the wheel is held upon the threaded lugs or studs and to reinstate the nuts after a wheel has been mounted, a wrench is provided as regular equipment for the motor vehicle. This wrench is usually of the socket type, indicated at 10, and adapted to fit over a nut and engage the same so that, when the wrench is turned, the nut will be caused to work on or off the stud or lug upon which it is mounted. The wrench includes a shank which may be of any approved length and between its ends is formed with an offset portion 11 constituting a crank whereby the tool may be easily turned so as to effect the mounting or demounting of a nut. Ordinarily, the end of the shank, remote from the nut-engaging socket 10, is given a shape corresponding to the socketed end of the wrench so that when this end is engaged with a wheel the wheel is supported upon a straight bar corresponding in all essential respects to the straight bar or stem, in the end of which the socket 10 is formed. In carrying out the present invention, however, the portion of the shank remote from the socket is given an arcuate form, as shown at 12, and it will be readily noted, upon reference to Figures 1 and 2, that when this arcuate stem is engaged through one of the openings 9 in the wheel drum, the wheel is supported at the low point of the arc and if the tool be swung upwardly, as indicated in Figures 1 and 2 by the arrow in Figure 1, the wheel will at once move toward the drum or hub on which it is to be mounted, whereas, if the stem were straight and in alinement with the socketed stem, the wheel would not begin to move toward the hub until the stem had assumed a position above the horizontal plane of the lug with which the tool is engaged. With my improved tool, the wheel starts at once to move toward the lugs and when the tool reaches the position shown in Figure 2 the drum of the wheel will be so close to the studs that it will slide easily and smoothly onto the studs without any jar and in such a gentle manner that there is no damage done to any of the threads on the studs. I have also found that owing to the arcuate form of the shank the weight of the wheel imposed thereon will tend to hold the cranked portion of the tool in an upright position so that the wheel may be easily maintained in proper position to readily slip onto the several studs or lugs.

The extremity of the arcuate stem is formed with a socket so that it may be readily engaged over the end of a threaded stud or lug. This socket is shown at 13, more particularly in Figures 4 and 5, and is provided with a flange or lip 14 in its upper portion, the inner edge of which flange or lip is eccentric to the stem and socket so that it presents a crescent outline, as shown in Figure 6. The diameter of the stem is somewhat greater than the diameter of the lug or stud with which the tool is to be engaged and by reason of this difference the lip or flange 14 will engage between two threads of the stud or lug at its center only while its ends will project beyond the side of the stud or lug, as shown in Figure 6, so that when the tool is rocked about the edge of the lip, the end portions of the lip will not strip the side portions of the thread on the lug or stud. Although only a single lip or flange is shown, two or more lips, of course, may be provided. It is also to be noted that the socket 13 is open at its bottom, as shown at 15, and the underside of the tool is beveled or cut away upon an incline to permit the tool to be readily engaged with the stud at an angle thereto. In Figure 4, the end of the tool is shown as arranged substantially in horizontal alinement with the stud with which it is engaged, while in Figure 5, the end of the tool is shown as tilted upwardly to engage the stud, the beveled or inclined cut away portion of the stem permitting the inner end of the socket 13 to be disposed close to the end of the lug while the lip 14 is engaged with the upper side of the lug. The socket 13 should be of sufficient depth to permit the tool to clear the end of the lug as it is rocked thereon and a slight concavity, as indicated at 16, is preferably formed in the underside of the stem and leading from the inner end of the socket to increase the capabilities of the tool to be disposed at an angle to the stud and clear the same in the angular relation. It is also to be noted that the inner end of the socket at its lower side is provided with a shoulder or stop 17 which, when the tool is presented to the lug in substantially horizontal alinement therewith, the end of the stud will abut said shoulder, and, consequently the extent to which the socket 13 may be disposed over the stud will be limited and interference between the side walls of the socket and the side threads of the stud will be avoided. By providing the concave surface 16, I am also enabled to extend the side walls of the socket somewhat and thereby strengthen the working end of the tool. Also, the socketed end of the tool may be of increased external diameter, relative to the main length of the tool, so as to obtain greater strength without appreciable increase of weight.

The offset or cranked portion 11 of the shank is provided upon its straight side with a claw or tooth 18 which tapers from the shank to its end and is also projected toward the nut socket end of the tool, as clearly shown in Figures 1, 2 and 3. By disposing the tool, as shown in Figure 3, with the claw or tooth 18 in engagement with the edge of the hub cap 6 and the nut-receiving socket disposed at or against the lower portion of the hub cap and then swinging the tool downwardly, as indicated by the arrow in Figure 3, the cap may be very quickly and easily removed from the wheel so that access to the nuts securing the wheel in place may be had.

It is thought that the use of the tool will be readily understood from the foregoing description, taken in connection with the accompanying drawings. When it is necessary to remove a wheel, the hub cap is first displaced, as stated, and the nut wrench end of the tool is then inserted through the outer large opening in the end of the drum to engage the several nuts successively and remove the same. The wheel is then simply lifted from the drum, as will be understood. While the wheel may be very easily removed from the drum, the work of re-mounting the wheel is not so easy unless some tool is provided to facilitate the operation and my present tool performs that function in a highly satisfactory manner. Preferably, the arcuate end of the shank of the tool is engaged through the lowest opening 9 in the wheel and then has its socket engaged over the lowest stud 3, the weight of the wheel carried by the tool serving to hold the wheel and the hub against rotation so that the tool will remain easily in engagement with the lowest stud and it will not be necessary to apply the brakes, it being understood, of course, that the hub is jacked up before the wheel is removed in order that the tire of the wheel may clear the ground and avoid such contact therewith as would retard the operation. If the brakes be applied so as to hold the hub against rotation, the tool may be engaged with an upper stud or lug after being inserted through the corresponding opening in the wheel drum, but ordinarily it will be found more convenient to engage the tool through a lower opening and with the lowest stud. If the tool be swung upwardly, as indicated by the arrow in Figure 1, the wheel may be held against movement by slight pressure from the free hand of the operator and, as has been before stated, it will slide easily and quickly into proper engagement with the several studs or lugs. Inasmuch as the wheel starts to move toward the hub with the first upward movement of the tool, the wheel will not be lifted so high that the tire thereon will impinge against the wheel fender which, in present-day cars, is set quite low, but will ride under the fender so as to clear the same before completing the upward movement. As the tool is swung upwardly, it will rock about the edge of the lip or flange 14 as a pivot while the weight of the wheel will prevent the tool being drawn outwardly out of engagement with the threads of the stud. The lip or flange 14 is of such thickness that it will rock easily between adjacent threads and will not wear or strip the same, as will be readily understood upon reference to Figures 4 and 5, but after the wheel drum has been engaged with the studs, the tool may be very readily lifted out of engagement with the stud and then withdrawn. The tool is very simple and has been found in use to be highly efficient for the purpose for which it is designed.

Having thus described the invention, I claim:

1. A wheel-mounting tool comprising a shank having a cranked portion, one side of the cranked portion of the shank being arcuate and provided with a stud-engaging socket in its end.

2. A wheel-mounting tool comprising a shank having a cranked portion, one side of the cranked portion being arcuate whereby to engage through an opening in a wheel flange and support the same and cause the wheel to move toward the end of the shank during the entire period of upward movement of the shank, the shank being provided at the extremity of its arcuate portion with means to engage over and rock upon a threaded stud.

3. A wheel-mounting tool comprising a shank provided in one end with a socket adapted to engage over a threaded stud, the upper wall of said socket having a downwardly projecting lip or flange at its end adapted to engage between adjacent threads on a stud and rock thereon, said flange having its inner edge eccentric to the stud whereby the ends of the flange will clear the side threads on the stud.

4. A wheel-mounting tool comprising a shank provided at its end with a socket adapted to engage over a threaded stud and having an inwardly projecting lip on the upper wall of the socket adapted to engage between the adjacent threads of the stud and rock thereon, the bottom of the socket being open and the underside of the stem being beveled whereby to clear the end of the threaded stud.

5. A wheel-mounting tool comprising a shank provided in its end with an open bottom socket and an inwardly projecting lip on the upper wall of the socket at the end of the same, the inner end of the socket being arcuate and the underside of the stem being beveled at the bottom of the socket whereby a stop shoulder is provided to limit the entrance of a stud into the socket.

JAMES M. PATTERSON [L. S.]